United States Patent [19]

Chung et al.

[11] Patent Number: 5,302,418
[45] Date of Patent: Apr. 12, 1994

[54] PROCESS FOR SURFACE-MODIFYING POLYPROPYLENE OR POLYETHYLENE

[75] Inventors: Tai-Shung Chung, Morris; Edward R. Kafchinski, Union, both of N.J.

[73] Assignee: Hoechst Celanese Corp., Somerville, N.J.

[21] Appl. No.: 870,526

[22] Filed: Apr. 17, 1992

[51] Int. Cl.$^5$ ............................................... B05D 1/18
[52] U.S. Cl. ........................... 427/389.9; 427/412; 427/412.3; 427/393.5
[58] Field of Search .................. 428/375, 378, 394; 427/393.5, 412.3, 412, 389.9

[56] References Cited

U.S. PATENT DOCUMENTS

| | | | |
|---|---|---|---|
| 3,427,183 | 2/1969 | Portolani et al. | 427/412 |
| 3,922,473 | 11/1975 | Kosaka et al. | 427/412.3 |
| 4,563,392 | 12/1986 | Harpell et al. | 428/375 |
| 4,588,648 | 5/1986 | Krueger et al. | 428/475.8 |
| 4,675,210 | 6/1987 | Clayton et al. | 427/393.5 |
| 4,789,568 | 12/1988 | Matoba et al. | 427/412.3 |

FOREIGN PATENT DOCUMENTS

| | | | |
|---|---|---|---|
| 0009971 | 4/1980 | European Pat. Off. | 427/412.3 |
| 0286409 | 10/1988 | European Pat. Off. | |
| 3-14680 | 12/1991 | Japan | |

Primary Examiner—Terry J. Owens
Assistant Examiner—Erma Cameron
Attorney, Agent, or Firm—Joseph M. Mazzarese

[57] ABSTRACT

A process for coating a polypropylene or polyethylene surface with a maleic acid-grafted polypropylene or polyethylene copolymer. In this process, a dope containing the graft copolymer is applied to the polypropylene or polyethylene surface, e.g. by dip coating, at a temperature high enough to keep the copolymer solvated in the dope solvent. The surface is then dried to leave a porous graft polymer coating bonded to the polypropylene or polyethylene. The coated product has superior adhesion characteristics compared to uncoated polypropylene or polyethylene.

11 Claims, 1 Drawing Sheet

PROCESS FOR SURFACE-MODIFYING POLYPROPYLENE OR POLYETHYLENE

BACKGROUND OF THE INVENTION

This invention relates to a process for modifying the surface of polypropylene or polyethylene to improve surface adhesion properties, especially to a process for bonding a maleic acid-polypropylene or polyethylene graft copolymer to polypropylene or polyethylene.

Polypropylene and polyethylene are common, relatively inexpensive, plastic used in fibers, films, and other articles. They has many useful properties, but are difficult to blend with or bond to other polymers. As a rule, these polymers do not readily adhere to other polymers. CELGARD ® polypropylene fiber (made by Hoechst Celanese Corp., Charlotte, N.C.) is an example of a commercial polypropylene fiber.

Block and graft copolymers are often used as compatibilizers. See, e.g., U.S. Pat. Nos. 3,483,273, 3,860,442, 4,081,424, 4,107,130, and 4,110,303, the disclosures of which are herein incorporated by reference.

Polyolefins having functional monomers grafted thereon are known in the art. Acrylic acid grafted polypropylene, for instance, is produced by BP Chemicals, which sells this polymer as part of its POLYBOND ® product line. This product is used as a reactive compatibilizer for preparing polypropylene-polyester and polypropylene-polyamide blends. However, acrylic acid grafting causes polyolefins to degrade significantly, reducing the intrinsic viscosity, molecular weight, and other properties of the polymer; furthermore, the active surface area of the product copolymer is relatively low. Graft copolymers of this type are disclosed in U.S. Pat. Nos. 4,455,273 and 4,584,347, the disclosures of which are herein incorporated by reference.

Hoechst Celanese Corporation makes HOSTAPRIME ® HC 5, a maleic anhydride-grafted low molecular weight polypropylene coupling agent. Maleic anhydride grafted polyolefins are also available from BP Chemicals under the POLYBOND ® tradename. These products are used in polymer blends to improve the compatibility of blended polymers, e.g. in polypropylene-polyamide blends.

Pending U.S. patent application No. 622,563, filed Dec. 5, 1990, now U.S. Pat. No. 5,173,541 describes a graft copolymer comprising a polyolefin backbone or main chain, preferably polypropylene, having muconic acid groups pendant therefrom. The acid groups are bonded to the backbone of the polyolefin by free radical addition across a muconic acid double bond.

SUMMARY OF THE INVENTION

The present invention is a process for coating a polypropylene or polyethylene surface with a graft copolymer comprising maleic anhydride- or maleic acid-grafted polypropylene or polyethylene, said process comprising applying a dope containing said copolymer to said surface and then drying said surface. The process of this invention produces a porous copolymer coating bonded to said surface. The coated product has superior adhesion characteristics compared to uncoated polypropylene or polyethylene.

The temperature of the coating process is important. The dope must be hot enough to keep the copolymer dissolved in the dope solvent until the copolymer bonds to the surface.

It is an object of the present invention to provide a process for coating polypropylene or polyethylene with a graft copolymer.

It is another object of the present invention to provide a process for modifying the surface of polypropylene or polyethylene to improve its adhesion characteristics.

It is a further object of the present invention to provide a polypropylene or polyethylene which is coated with a graft copolymer comprising polypropylene or polyethylene and maleic acid or anhydride units.

It is an additional object of the present invention to provide a CELGARD ® polypropylene fiber having improved adhesion characteristics.

Other objects and advantages of the present invention will be apparent to those skilled in the art from the following description and the appended claims.

DETAILED DESCRIPTION OF THE PREFERRED EMBODIMENTS

Figure 1:
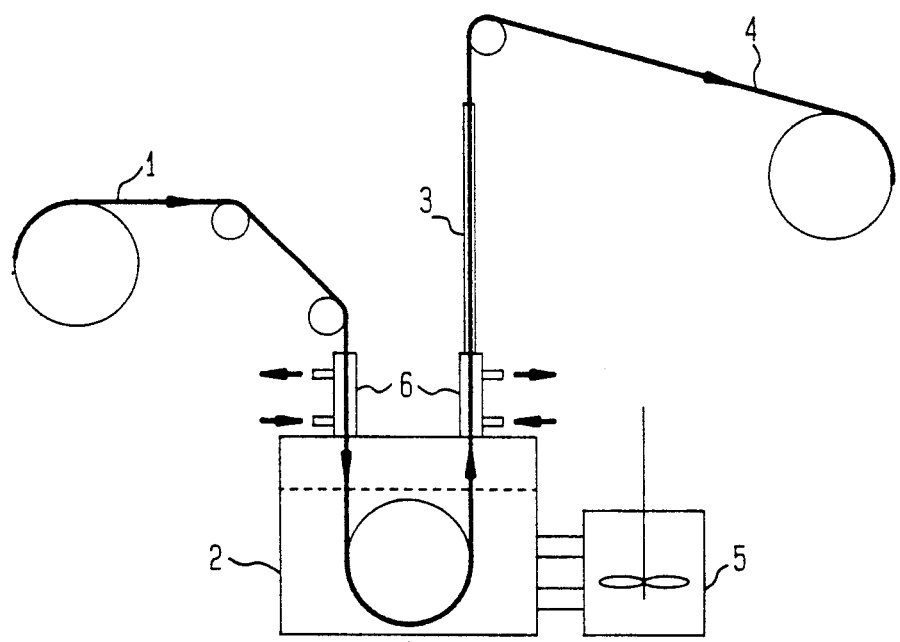
FIG. 1 illustrates one embodiment of a process according to the present invention.

In one preferred embodiment of the present invention, a CELGARD ® polypropylene fiber (made by Hoechst Celanese Corp., Charlotte, N.C.) is coated with HOSTAPRIME ® HC 5 maleic anhydride grafted low molecular weight polypropylene (made by Hoechst Celanese Corp., Charlotte, N.C.; melting point about 153°-159° C.), having at least about 4% by weight maleic acid content, according to the following procedure.

A dope is made by dissolving the HOSTAPRIME ® HC 5 copolymer powder in a solvent that is 80% xylene and 20% toluene by wt. at a temperature of at least about 100° C. to make a dope having about 2-15% solids content by weight, preferably about 3-10%. As illustrated in FIG. 1, the CELGARD ® polypropylene fiber 1 is passed through this dope 2 at a temperature of about 90°-110° C., preferably about 90°-100° C. After the fiber 1 passes through the dope 2 it is dried in a drying apparatus 3 at about 100°-140° C. until substantially all the solvent has vaporized, producing a coated fiber 4. A mixing unit 5 helps maintain the dope at a uniform temperature.

Cooling condensers or water jackets 6 serve to prevent solvent evaporation from the dope 2. These condensers do not touch the fiber 1, and must not cool the fiber 1 enough to cause precipitation of the polymer. The optimum temperature of the water or other coolant passing through the condensers 6 will depend on the system parameters, e.g., fiber speed, condensor dimensions, solvent, dope temperature, and the like. Typically, the water at a temperature of about 10°-20° C. is used.

The thickness of the coating may be varied as desired by controlling the solids content of the dope, and the residence time of the fiber in the dope bath (e.g., the fiber speed as it passes through, the length of the path the fiber travels in the dope bath, etc.). Generally, the thickness of the coating is about 0.1-25 microns, preferably about 0.5-10 microns.

To achieve a strong bond between the copolymer and the polypropylene fiber, it is necessary to maintain the dope at a sufficient temperature until the solvent vaporizes so that the copolymer will not prematurely precipitate; premature precipitation as the fiber passes through and/or exits the dope bath leads to poor adhesion of the copolymer to the polypropylene. This is often a problem where there is a gap between the dope bath and the drying section of the apparatus, since the dope-coated fiber will cool below the coating temperature while passing through the gap. For example, the copolymer could be dissolved in the solvent at a temperature of about 70° C. but using such a temperature has been found to cause the copolymer to precipitate rapidly and adhere poorly where a gap of about 20 mm exists between the dope and the drying apparatus. The lowest practical temperature that may be used will depend upon many factors, which may include: the solids content of the dope; the particular solvent and copolymer used in the dope; the air gap, if any, between the dope and the drying apparatus; the fiber tension; and the speed of the fiber.

The temperature must never be high enough to cause any damage or decomposition of the fiber or the copolymer, nor to reach the boiling point of the solvent. However, it must be high enough to keep the copolymer in solution. Generally, a dope bath temperature of about 85°–110° C. is suitable, preferably about 90°–105° C. The drying column temperature should be at least as high and may be slightly higher, e.g. about 90°–150° C., preferably about 100°–130° C. The optimal temperatures for a given embodiment of the present invention depend on several variables, including the coating thickness, the coating speed, and the solid content of the dope.

The dope solvent may be any suitable solvent having one or more components which is capable of dissolving the copolymer, does not cause undesirable reactions, and is easily vaporized at a temperature low enough to avoid damaging the polypropylene or copolymer. Organic solvents having low polarity are preferred. Xylene and toluene are useful for this purpose, and mixtures of these solvents have been found to be very good solvents in the process of the present invention. Preferably, the solvent comprises about 30–100% xylene and about 0–70% toluene.

Although commercial polypropylene hollow fiber and copolymer have been used in the above embodiment, any polypropylene or polyethylene fiber, film. or other article may be coated by this process, and many similar maleic acid-grafted copolymers may be used. The copolymer should contain about 0.5–10% by wt. of units derived from maleic acid, and a melting point of about 140°–190° C. These copolymers may be made by conventional methods for forming graft copolymers, e.g., by free radical addition of the maleic moiety to the polymer chain. The starting material for making such copolymers may include either maleic acid or maleic anhydride, or other maleic acid derivatives; the term "maleic acid-grafted" used herein encompasses all such copolymers. The chemical structure of these copolymers may be represented by the following:

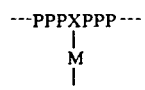

where P represents a repeating polymer chain unit, M represents the maleic moiety, and X is the polymer unit to which M is bonded.

The surface-modified polypropylene or polyethylene obtained by the process of the present invention may be subsequently coated with another layer of material, e.g., another polymer, a layer of material useful for fluid separations, an abrasion-resistant layer, or any other desirable coating. The copolymer coating enhances the bonding of such subsequent coatings to the polypropylene or polyethylene article. These coatings may be applied by any means known in the art.

The following non-limiting Examples illustrate several embodiments of the present invention. However, these Examples are only intended as illustrative, and the scope of the present invention is not limited to the embodiments illustrated herein; the scope of the present invention encompasses the entire subject matter covered by the appended claims.

EXAMPLE I

HOSTAPRIME ® HC 5 maleic anhydride-grafted polypropylene was dissolved in an 80/20 (w/w) xylene/toluene solvent at 103° C. with stirring in an amount calculated to achieve a dope solution comprising 3% HOSTAPRIME by weight. This dope remained stable at 85° C., but became opaque below 70° C. At room temperature there was no clear phase separation, but instead the polymer dispersed throughout the solvent.

The dope was placed in a container or reservoir that was temperature controlled and almost completely sealed. A CELGARD ® polypropylene fiber (m.p. about 180°–190° C.) was coated with the dope by passing the fiber through this dope reservoir at a speed of 6 meters/min. The fiber passed out of the reservoir and into a heated drying column where the solvent was driven off. Condensers maintained at 16° C. were located at the reservoir openings, e.g., between the reservoir and the drying column.

This process was conducted at several temperatures, as shown in Table I. Table I also presents data on the final product, i.e. the dry coated fiber, specifically oxygen permeances and observations based upon SEM (Scanning Electron Microscopy) studies of the fiber coatings. The permeances were measured at an oxygen pressure of 50 psi.

TABLE I

| Dope(°C.) | Column(°C.) | $O_2$(cc/min) | SEM Observations |
|---|---|---|---|
| 93 | 139 | 4 | particles tightly packed, with molten appearance |
| 95 | 110 | 12 | inter-connected sintered particles |
| 80 | 140 | 79 | loose, scattered particles, not a uniform coating |

Uncoated CELGARD: 200

EXAMPLE II

The effect of coating speed was tested by coating a fiber according to the procedure of Example I using a dope temperature of 95° C. and a column temperature of 110° C., as in the second fiber of Table I, except that the coating speed was reduced from 6 m/min to 3 m/min. At the slower coating speed, SEM showed a tighter, denser particle structure.

EXAMPLE III

HOSTAPRIME ®-coated CELGARD ® X10 fibers and uncoated CELGARD ® fibers were each coated with three layers of about 700 Å of SIXEF ™-Durene polyimide (a polyimide derived from 2,2-bis[3,4-dicarboxyphenyl] hexafluoropropane dianhydride and 2,3,5,6-tetramethylphenylene diamine moomers, made by Hoechst Celanese Corporation), a material that has a good selectivity for oxygen vs. nitrogen.

The HOSTASPRIME-treated fibers were sealed in one module and the untreated fibers were sealed into another module. Table II shows the oxygen/nitrogen selectivity (calculated by dividing the nitrogen permeance into the oxygen permeance) of each at various air pressures. These data indicate that at relative high pressures, the fibers that were treated with HOSTAPRIME prior to being coated with the selective material exhibit superior performance. This means that treated fibers can withstand a higher bore pressure without losing selectivity; higher operational pressure can mean faster gas separations.

TABLE II

| Air Pressure(psi) | $O_2/N_2$ Selectivity: Untreated Fiber | Treated Fiber |
| --- | --- | --- |
| 60 | 4.2 | 4.1 |
| 90 | <3.5 | 5.0 |
| 150 | <2.0 | 3.4 |

EXAMPLE IV

HOSTAPRIME®-coated CELGARD® fibers were prepared as in Example II using a coating speed of 3 m/min, except that the dope was 10% HOSTAPRIME by weight. The dope temperature was maintained at 103° C. and the drying column located above the dope reservoir was kept at 105° C. A condenser, through which 16° C. water was flowing, was placed over the dope reservoir opening and about 5-7 cm below the drying column.

SEM observation of the coated fibers indicated that a new three-dimensional surface porosity was present.

A 6-cm long hollow fiber module was prepared and tested in a cell filled with oxygen at various pressures. A permeance at 20 psi of 9 cm³/min was observed, compared to 74 cm³/min for uncoated CELGARD.

Many variations and equivalents of the present invention will occur to those skilled in the art. The present invention is not limited to the embodiments illustrated or described, but includes all the subject matter within the spirit and scope of the appended claims and of the foregoing disclosure.

We claim:

1. A process for bonding a copolymer to a polypropylene or polyethylene surface, which copolymer comprises a maleic acid-grafted polypropylene or polyethylene copolymer, said process producing a copolymer surface coating adapted to adhere at gas pressures up to about 90 psi to a material having selective permeance to gases said process comprising:

coating said surface with a dope, said dope comprising said copolymer and a solvent, at a coating temperature sufficient to keep said copolymer dissolved in said solvent; and, drying said coated surface at a drying temperature sufficient to vaporize said solvent which drying temperature is at least as high as said coating temperature, wherein the temperature of said dope is not allowed to fall below that needed to keep said copolymer dissolved in said solvent prior to drying.

2. A process according to claim 1 wherein said coating temperature is at least about 85° C., but not high enough to cause said solvent to boil or to cause decomposition of said polypropylene or polyethylene surface or of said copolymer.

3. A process according to claim 2 wherein said coating temperature is about 90°-110° C.

4. A process according to claim 1 wherein said drying temperature is at least about 85° C., but not high enough to cause decomposition of said polypropylene or polyethylene surface or of said copolymer.

5. A process according to claim 4 wherein said drying temperature is about 100°-150° C.

6. A process according to claim 4 wherein said drying temperature is about 100°-130° C.

7. A process according to claim 1 wherein said solvent comprises toluene and xylene.

8. A process according to claim 1 wherein said polypropylene or polyethylene surface is the surface of a polypropylene or polyethylene fiber.

9. A process according to claim 1 wherein said dope has a copolymer content of about 2-15% by weight.

10. A process according to claim 9 wherein said dope has a copolymer content of about 3-10% by weight.

11. A process according to claim 1 further comprising coating another polymer over said copolymer after said drying is completed.

* * * * *